United States Patent
Yang et al.

(10) Patent No.: US 7,806,709 B2
(45) Date of Patent: Oct. 5, 2010

(54) LAMP SOCKET AND DISPLAY DEVICE HAVING THE SAME

(75) Inventors: Yong-Seok Yang, Asan-si (KR); Jung-Tae Kang, Suwon-si (KR); Jin-Ho Ha, Suwon-si (KR); Yoon-Soo Kwon, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 227 days.

(21) Appl. No.: 11/928,241

(22) Filed: Oct. 30, 2007

(65) Prior Publication Data

US 2008/0102711 A1    May 1, 2008

(30) Foreign Application Priority Data

Oct. 31, 2006    (KR)    ............... 10-2006-0106655

(51) Int. Cl.
   *H01R 33/02*    (2006.01)
(52) U.S. Cl. ...................... 439/232; 439/235
(58) Field of Classification Search ............... 439/225, 439/226, 232, 235
   See application file for complete search history.

(56) References Cited

U.S. PATENT DOCUMENTS

| | | | |
|---|---|---|---|
| 6,050,708 A | 4/2000 | Roorda | |
| 6,060,708 A | 5/2000 | Grubner | |
| 6,157,117 A | 12/2000 | Taylor | |
| 6,733,316 B1* | 5/2004 | Chen | 439/232 |
| 6,869,298 B2* | 3/2005 | Latsis | 439/157 |
| 7,347,705 B1* | 3/2008 | Huang et al. | 439/231 |
| 7,530,828 B2* | 5/2009 | Miyazono | 439/232 |
| 2006/0274552 A1* | 12/2006 | Kim et al. | 362/612 |
| 2006/0279957 A1 | 12/2006 | Kwon | |

FOREIGN PATENT DOCUMENTS

| | | |
|---|---|---|
| EP | 1 760 395 A1 | 3/2007 |
| WO | 03/007434 A1 | 1/2003 |

OTHER PUBLICATIONS

European Search Report for Application No. 07021167.7—2423, date of mailing Jan. 30, 2008.

* cited by examiner

*Primary Examiner*—Hien Vu
(74) *Attorney, Agent, or Firm*—Innovation Counsel LLP

(57) ABSTRACT

A display device includes a backlight assembly and a panel assembly. The backlight assembly includes lamps which emit light when properly powered. Each of the lamps includes a lead terminal, and receives electric power through a lamp socket that is electrically connected to an external power supply. The lamp socket includes a socket cover inserted in the lamp socket. The socket cover supportively embraces a resilient contact terminal within the socket body and thus helps the contact terminal to maintain grip with the lead terminal. The socket cover includes a metal material that is able to absorb and safely dissipate heat impulses from nearby intermittent sparks, so that the socket cover is not substantially deformed by the heat impulses of multiple sparks that occur nearby at contact points between the lamp lead terminal and the socket contact terminal.

15 Claims, 9 Drawing Sheets

LAMP SOCKET AND DISPLAY DEVICE HAVING THE SAME

CROSS-REFERENCE TO RELATED APPLICATION

This application relies for priority upon Korean Patent Application No. 2006-106655 filed on Oct. 31, 2006, the disclosure of which is herein incorporated by reference in its entirety.

BACKGROUND

1. Field of Invention

The present disclosure of invention relates to a lamp socket and a display device having the same. More particularly, the present disclosure relates to a lamp socket having improved reliability and a display device having the lamp socket.

2. Background Description

In general, an image display device includes a panel assembly that displays an image thereon and a backlight assembly that supplies light to the panel assembly.

The backlight assembly includes lamps that emit light, inverters that supply high voltage electric power to the lamps and lamp sockets that electrically connect to corresponding lead terminals of the lamps to supply the electric power to the lamps. In general, a thin resilient contact member is used in the lamp socket to make resilient (spring like) electrical contact with the lead terminal of the lamp. The resilient contact member achieves its resiliency in part from its relatively thin construction.

When a lamp socket electrically connects to the lead terminal of a lamp unstably, a spark may occur at a contact point between the lead terminal of the lamp and the thin resilient contact member of the lamp socket since a size of a contact area between the lead terminal and the thin resilient contact member becomes smaller than what was designed for and it may occasionally disconnect into a small open circuit gap. When the size of the contact area between the lead terminal and the thin resilient contact member rapidly decreases or temporarily reverts into an open circuit gap, current transmitting from the thin resilient contact member to the lead terminal is often partially discharged as a spark.

When the lamp socket is exposed to repeated sparks for long periods of time, the lamp socket tends to become cumulatively deformed by heat generated from the sparks. The progressively increasing deformity may cause further loss of good contact and further sparks and may ultimately cause the lamp socket to become electrically disconnected more permanently from the lead terminal of the lamp, this leading to undesirable lamp outage.

SUMMARY

In accordance with one aspect of the present disclosure, a lamp socket is structured to include a body, a first socket terminal placed in the body and formed to electrically connect with a lead terminal of an external light-emitting device, a second socket terminal placed in the body and formed to electrically connect with the first socket terminal so as to provide an electric power from an external power supply unit to the first socket terminal, and a socket cover made of a metal material.

The socket cover is located between the body of the lamp socket and the first socket terminal so as to supportively embrace the first socket terminal, and to more assuredly maintain electrical contact between the lead terminal of a supplied lamp and the first socket terminal. As a consequence of the embracing support provided by the socket cover, the first socket terminal may continue to resiliently grip the lead terminal even after being subjected to heat that might otherwise (without presence of the socket cover) deform the first socket terminal and the first socket terminal may therefore remain electrically connected with the lead terminal stably.

The socket cover includes a metal material having good thermal conductivity. Even though a spark may occur at a temporarily decreased contact point between the first socket terminal and the lamp's lead terminal due to unstable connection between the first socket terminal and the lead terminal, the socket cover is structured so to be not deformed by the heat from the spark, to absorb and dissipate the heat impulse generated by the spark, and the socket cover is thereby able to continue providing embracing support to the first socket terminal so that the first socket terminal continues to stably make contact with the lead terminal of a supplied lamp.

In one embodiment, the socket cover further includes a terminal cover composed of metal material that is able to absorb and dissipate the heat impulse generated by a nearby spark. The terminal cover may operate to prevent detachment of the lead terminal from the first socket terminal.

Although the lead terminal may be displaced so as to not be fully gripped by the first socket terminal, the lead terminal may nonetheless continue be connected to the first socket terminal electrically since the terminal cover includes the metal material and makes contact with the displaced lead terminal contact as well as making contact with the first socket terminal.

In one embodiment, the terminal cover covers the lead terminal so that the terminal cover shields against an outward propagation of heat spike generated from a nearby lead terminal due to an intermittent spark and the terminal cover thus prevents the heat (or other radiant energy) from being directed to components that are less tolerant of such heat (or other radiant energy). In one embodiment, the socket cover is substantially composed of a nonmetal material (e.g., a plastic) except for the terminal cover which is composed of the thermal hock-dissipating metal material. In other words, although only the terminal cover includes the metal material, the socket cover may nonetheless be substantially unaffected by heat from the spark due to the shielding function provided by the metal terminal cover.

In another aspect of the present disclosure, a liquid crystal display includes a panel assembly, and a backlight assembly providing light to the panel assembly. The backlight assembly includes lamps, and each of the lamps includes a lead terminal formed at two end portions thereof. The lead terminals are electrically connected to spark tolerant lamp sockets such as described above.

BRIEF DESCRIPTION OF THE DRAWINGS

The above and other advantages of the disclosed structure will become apparent by reference to the following detailed description when considered in conjunction with the accompanying drawings wherein.

DETAILED DESCRIPTION

Figure 1:
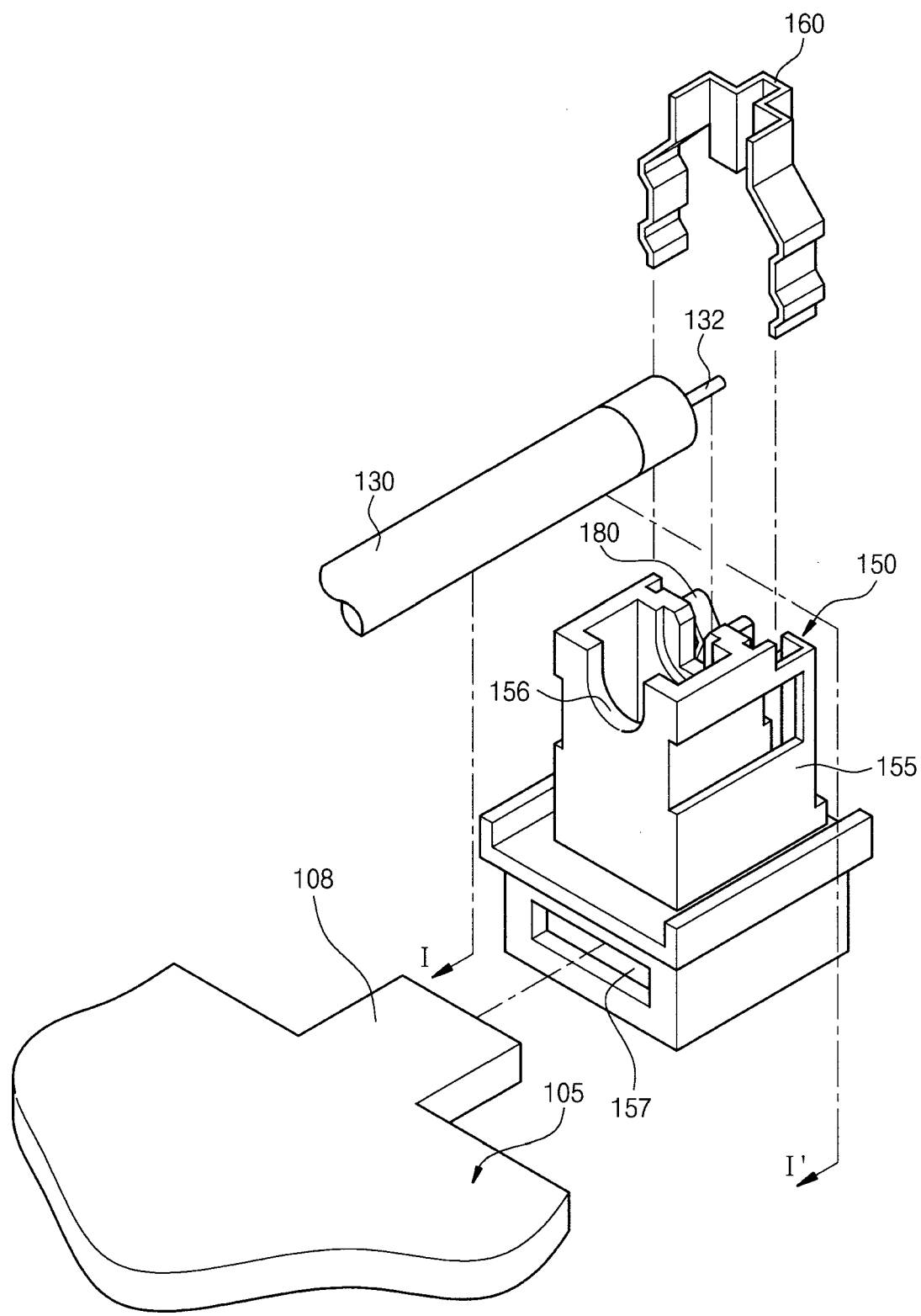
FIG. 1 is a perspective view illustrating an exemplary embodiment of a lamp socket coupled with an inverter and a lamp structured according to the present disclosure of invention.

It will be understood that when an element or layer is referred to herein as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all couplings of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure most closely pertains. It will be further understood that terms, such as those defined in commonly used dictionaries, should be interpreted as having a meaning that is consistent with their meaning in the context of the relevant art and will not be interpreted in an unreasonably idealized or overly formal sense unless expressly so defined herein.

Hereinafter, the present disclosure will be explained in detail with reference to the accompanying drawings.

FIG. 1 is a perspective view illustrating an exemplary embodiment of a lamp socket coupled with an inverter terminal and a lamp according to the present disclosure.

Referring to FIG. 1, a lamp socket 150 includes an outer body 155 that is formed of a plastic and/or other insulative material. A conductive first socket terminal 180 is placed within the outer body 155 and is formed to electrically and flexibly connect to a relatively rigid lead terminal 132 of a supplied lamp 130. A conductive second socket terminal 196 (see FIG. 2B) is further placed within the insulative outer body 155 and is formed to electrically connect to an inverter terminal 108. An electrically conductive and heat tolerant socket cover 160 (shown exploded away in FIG. 1) is insertably disposed between the insulative outer body 155 and the resilient first socket terminal 180.

The outer body 155 is provided with a first terminal inserting opening 157 formed at a lower portion thereof to receive and contain the inverter terminal 108. When the inverter terminal 108 is inserted into the first terminal inserting opening 157, electric power from the inverter board 105 (typically in the form of a relatively high voltage) may be supplied to the first socket terminal 180 through the second socket terminal 196 (including through a vertical extension 195 thereof—see FIG. 2A) and therethrough to the first socket terminal 180 that is connected (not shown) to the second socket terminal 196. In addition, the electric power supplied to the first socket terminal 180 is thereby applied to the lead terminal 132 of the lamp when the lead terminal 132 is electrically connected to the first socket terminal 180, so that the lamp can be operated by the electric power.

The outer body 155 is partially hollowed as shown at 156 to thereby define a lamp supporting portion or ledge 156 into whose open space a lamp body 130 is received. A portion of the lamp body 130 adjoining the lead terminal 132 is received in the lamp supporting portion 156, and the lamp supporting portion 156 supports the lamp body 130 to help prevent the lead terminal 132 from being detached from the first socket terminal 180.

The socket cover 160 includes a conductive metal material of sufficient thickness so that it does not substantially deform when exposed to heat. In one embodiment, the conductive metal material may be a copper or a copper alloy such as a bronze so that the socket cover 160 has good electrical conductivity and strength, the conductive metal material of the socket cover 160 is the same as that of the first socket terminal 180 except that the thickness and construction of the socket cover 160 is different as will be detailed in the following description. The conductive socket cover 160 is placed between the conductive first socket terminal 180 and the insulative outer body 155 and is electrically coupled to the first socket terminal 180. The socket cover 160 embracingly supports two flexible end portions of the first socket terminal 180, and positions those end portions so that the first socket terminal 180 may continue to resiliently grip the lead terminal 132 even after heat is generated by an intermittent spark.

Since the socket cover 160 is thicker and includes a metal material having electrical and thermal conductivity, the socket cover 160 is not deformed even when thermal stress is applied thereto. Therefore, even though the socket cover 160 is exposed to heat originating from, for example a spark produced at a temporarily decreased contact point between the lead terminal 132 and the resilient thin first socket terminal 180, the thicker and less resilient socket cover 160 substantially maintains its form and it also preserves the contact clamping force provided by the elasticity of the thinner, smaller first socket terminal 180 that grips the lead terminal 132.

It is desirable that the thin resilient first socket terminal 180 makes direct gripping contact with the lead terminal 132 while the larger socket cover 160 is interposed between the outer socket body 150 and the resilient first socket terminal 180. The shape and less resilient structure of the socket cover 160 operates to make the first socket terminal 180 grip the lead terminal 132 more strongly.

In the illustrated embodiment of FIG. 1, the socket cover 160 is composed of only the same metal material as that forming the thin resilient first socket terminal 180. However, in an alternate embodiment, the socket cover 160 may include a mechanically strong plastic material that retains its shape even when heated slightly and the mechanically strong plastic material may be coated with a thermally conductive and electrically conductive metal material that covers a substantial portion of the surface of that plastic material. When the surface of the socket cover 160 is so coated with a heat absorbing and heat dissipating metal material, the socket cover may resist being deformed even when a spike of thermal stress is applied thereto. The interior plastic material of this alternate, metal coated socket cover 160' (not shown) may be the same material as that of the insulative outer body 155.

Figure 2A:
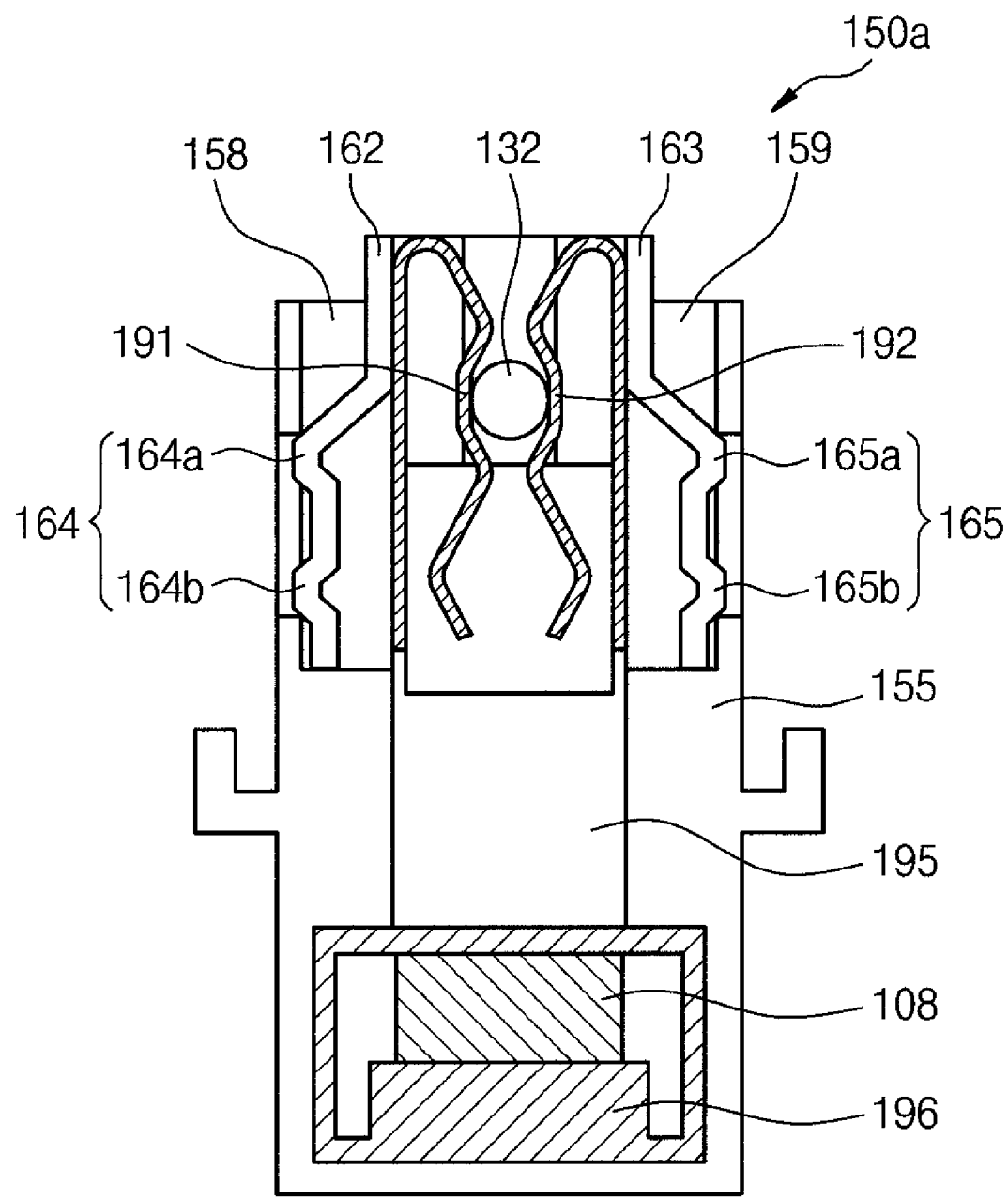
FIG. 2A is a cross-sectional view taken along a plane I-I' shown in FIG. 1.
Figure 2B:
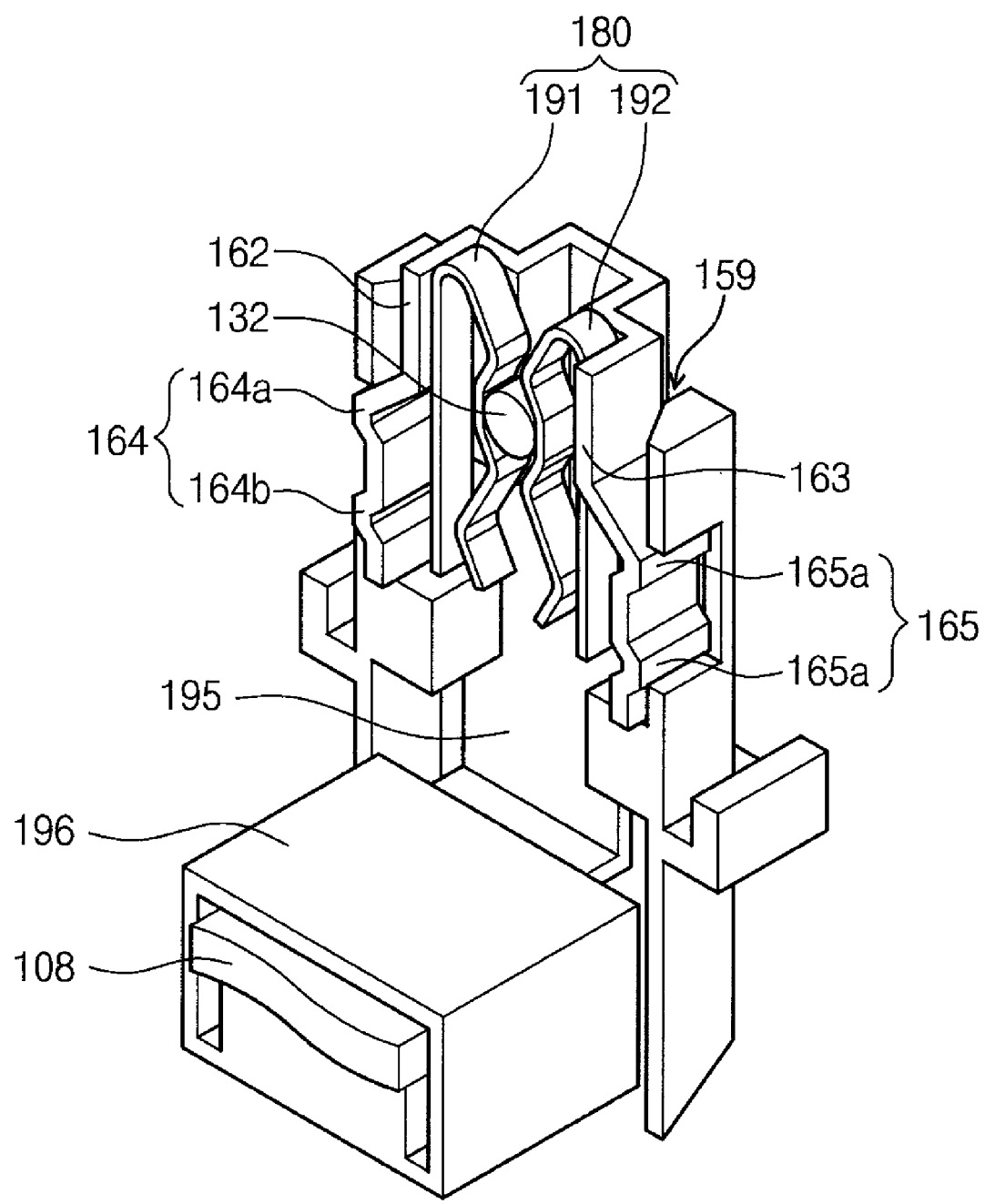
FIG. 2B is a perspective view illustrating a lamp socket having a body partially removed.
Figure 3:
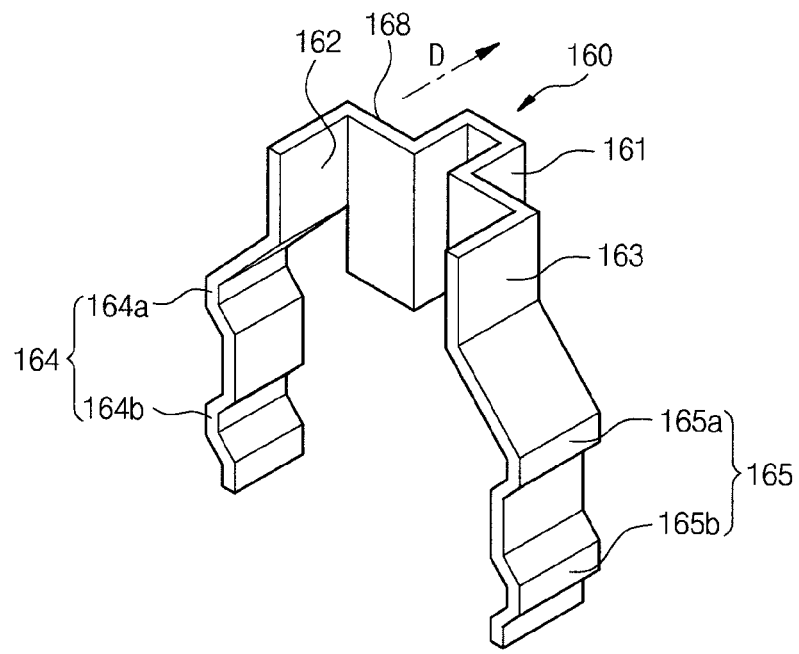
FIG. 3 is a perspective view illustrating an exemplary embodiment of a socket cover according to the present disclosure.

FIG. 2A is a cross-sectional view taken along a plane I-I' shown in FIG. 1, FIG. 2B is a perspective view illustrating a lamp socket having a body partially removed, and FIG. 3 is a perspective view illustrating an exemplary embodiment of a socket cover 160 according to the present disclosure.

Referring to FIGS. 2A, 2B and 3, the first socket terminal 180 includes a first auxiliary terminal portion 191, a second auxiliary terminal portion 192, that are bent and integrally continue from a first connecting portion 195 that integrally supports the first and second auxiliary terminal portions 191-192 and that electrically connects the first and the second auxiliary terminals 191 and 192 to each other and also via an L-bend at the bottom of the first connecting portion 195 (see FIG. 2B) to the second socket terminal 196.

The first and the second auxiliary terminals 191 and 192 each have a round shaped section to grip the lead terminal 132 at opposed sides as seen in FIG. 2A. The first and the second auxiliary terminals 191 and 192 extend toward and merge contiguously with the first connecting portion 195. The first connecting portion 195 extends toward and merges contiguously with the second socket terminal 196 so as to thereby provide electrical continuity from the second socket terminal 196 to the first and the second auxiliary terminals 191 and 192.

Referring in particular to FIG. 2B, the socket cover 160 includes an upper first supporting portion 162 making contact with a side portion of the first auxiliary terminal 191, an upper second supporting portion 163 making contact with a side portion of the second auxiliary terminal 192, a lower first coupling portion 164 extended from the first supporting portion 162 to make connection with the first connecting portion 195 of the second socket terminal 196, a lower second coupling portion 165 extended from the second supporting portion 163 to make connection with the first connecting portion 195 of the second socket terminal 196, and a back end second connecting portion 168 extended from the first supporting portion 162 to merge contiguously with the second supporting portion 163 as shown for example in FIG. 3.

The socket cover 160 further includes a lead-circumventing or hooking portion 161. The hooking portion 161 is formed by bending the second connecting portion 168 in a predetermined direction D as shown in FIG. 3. The hooking portion 161 is formed to separate the socket cover 160 and the lead terminal 132 from each other. The determination of whether the socket cover 160 is provided together with the hooking portion 161 and then to what dimension of protrusion in direction D or not depends on the length and shape of the lamp's lead terminal 132.

As seen in FIG. 2A or FIG. 2B, the first and the second auxiliary terminal portions 191 and 192 are supported and embraced by the first and second supporting portions 162 and 163 of the cover 160, so that a terminal contacting force generated by the first and the second auxiliary terminals 191 and 192 and applied to the lamp terminal 132 may be maintained as long as the cover 160 substantially retains its shape. Therefore, the first and the second auxiliary terminal portions 191 and 192 may apply a gripping and contact force to the lamp's lead terminal 132 using the supporting or embracing base furnished by the first and second supporting portions 162 and 163 of the cover 160.

If the lamp's lead terminal 132 electrically connects to the first and the second auxiliary terminal portions 191 and 192 unstably, and a spark occurs around the area of the lead terminal 132, heat may be generated in that vicinity. However, since the socket cover 160 includes the heat absorbing, heat dissipating and heat tolerating metal material at least on its outer surface, the socket cover 160 is not cumulatively deformed by exposure to the heat of repeated sparks. Therefore, even though the socket cover 160 may be exposed to the heat shocks of multiple sparks, the shape of the socket cover 160 may be substantially maintained over a very long period of time.

Referring to FIG. 3, in one embodiment the lower left, first coupling portion 164 is formed by extending from the upper first supporting portion 162 toward the second socket terminal 196 and the lower left, first coupling portion 164 is partially bent as shown to provide a plurality of first convex portions 164a and 164b. Referring to FIGS. 2A-2B, the outer body portion 155 includes a first body coupling portion 158 that is opened or otherwise shaped to receive the lower left, first coupling portion 164, for example by removal of a portion of the outer body portion 155 to create a receiving opening in portion 158. The first coupling portion 164 is inserted into engagement with the first body coupling portion 158 so as to thereby mechanically couple the socket cover 160 with the insulative outer body 155.

In addition to the first body coupling portion 158 being shaped to receive the first coupling portion 164 of the cover 160, an inner side of the first body coupling portion 158 is left open to receive the first convex portions 164a and 164b in a wedging or clamping like fashion so the first coupling portion 164 may be coupled with the first body coupling portion 158 more strongly.

Still referring to FIG. 3, the lower right second coupling portion 165 of the cover 160 is formed by integrally extending from the second supporting portion 163 toward the second socket terminal 196 and by partially bending it to provide second convex portions 165a and 165b as shown. The outer body 155 includes a second body coupling portion 159 formed for example by removal of a portion of the body portion 155 to receive the lower right second coupling portion 165 of the cover 160. The second coupling portion 165 is inserted in the second body coupling portion 159 to couple the socket cover 160 with the body 155.

In addition to the second body coupling portion 159 being shaped to receive the second coupling portion 165, an inner side of the second body coupling portion 159 is removed to receive the second convex portions 165a and 165b in a wedging or clamping like fashion so that the second coupling portion 165 may be coupled with the second body coupling portion 159 more strongly.

Figure 4:
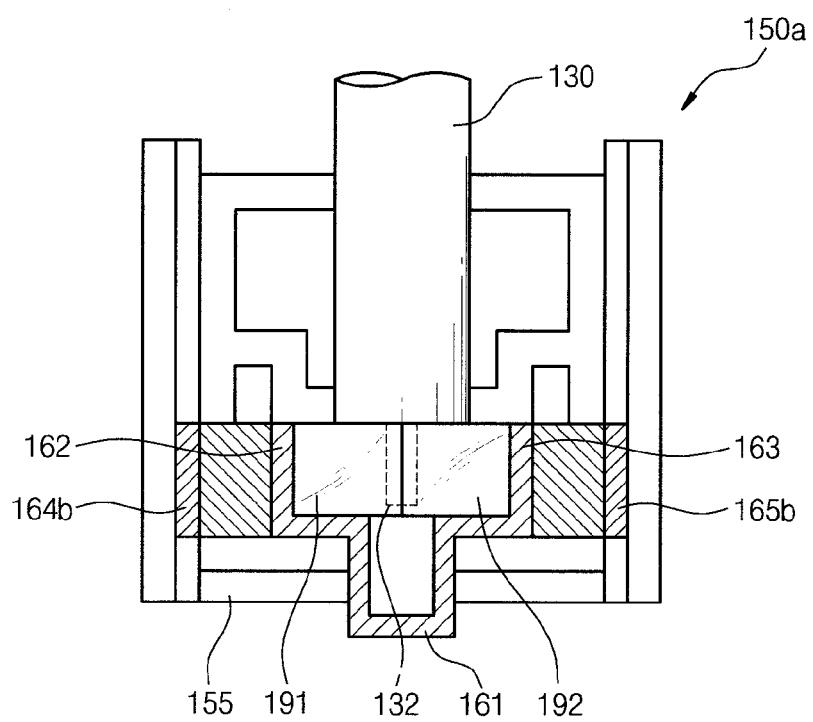
FIG. 4 is a plan view showing the lamp socket of FIG. 1.

FIG. 4 is a top view showing the lamp socket of FIG. 1.

Referring to FIG. 4, the first and second auxiliary terminal portions 191 and 192 directly grip the lead terminal 132. The first and the second supporting portions 162 and 163 of the cover 160 embrace the first and second auxiliary terminals 191 and 192 and thus provide a counterforce base to help to maintain the gripping forces of the first and the second auxiliary terminals 191 and 192 to grip the lead terminal 132.

One portion of the outer body 155 adjoining the lead terminal 132 receives and connects to the hooking portion 161 of the conductive cover 160. The insulative outer body 155 may be further provided with a hooking recess cover (not shown) which couples to and insulatively covers the conductive hooking portion 161 of the cover 160.

If the lead terminal 132 electrically connects to the first and second auxiliary terminal portions 191 and 192 unstably, and a spark occurs around the lead terminal 132, the heat energy generated by the spark is transmitted to, and absorbed by the upper first and the second supporting portions 162 and 163 that are located nearest to the lead terminal 132. However, since the socket cover 160 includes the heat absorbing, heat conducting and heat tolerating metal material surface, the socket cover 160 is not substantially deformed by the heat of the spark. Therefore, the first and the second supporting portions 162 and 163 of the socket cover 160 may maintain their shape and provide support for the grasping force of the first and second auxiliary terminal portions 191 and 192, thereby preventing the lead terminal 132 from becoming progressively detached from the first and second auxiliary terminals 191 and 192 due to heat-induced deformation.

Figure 5:
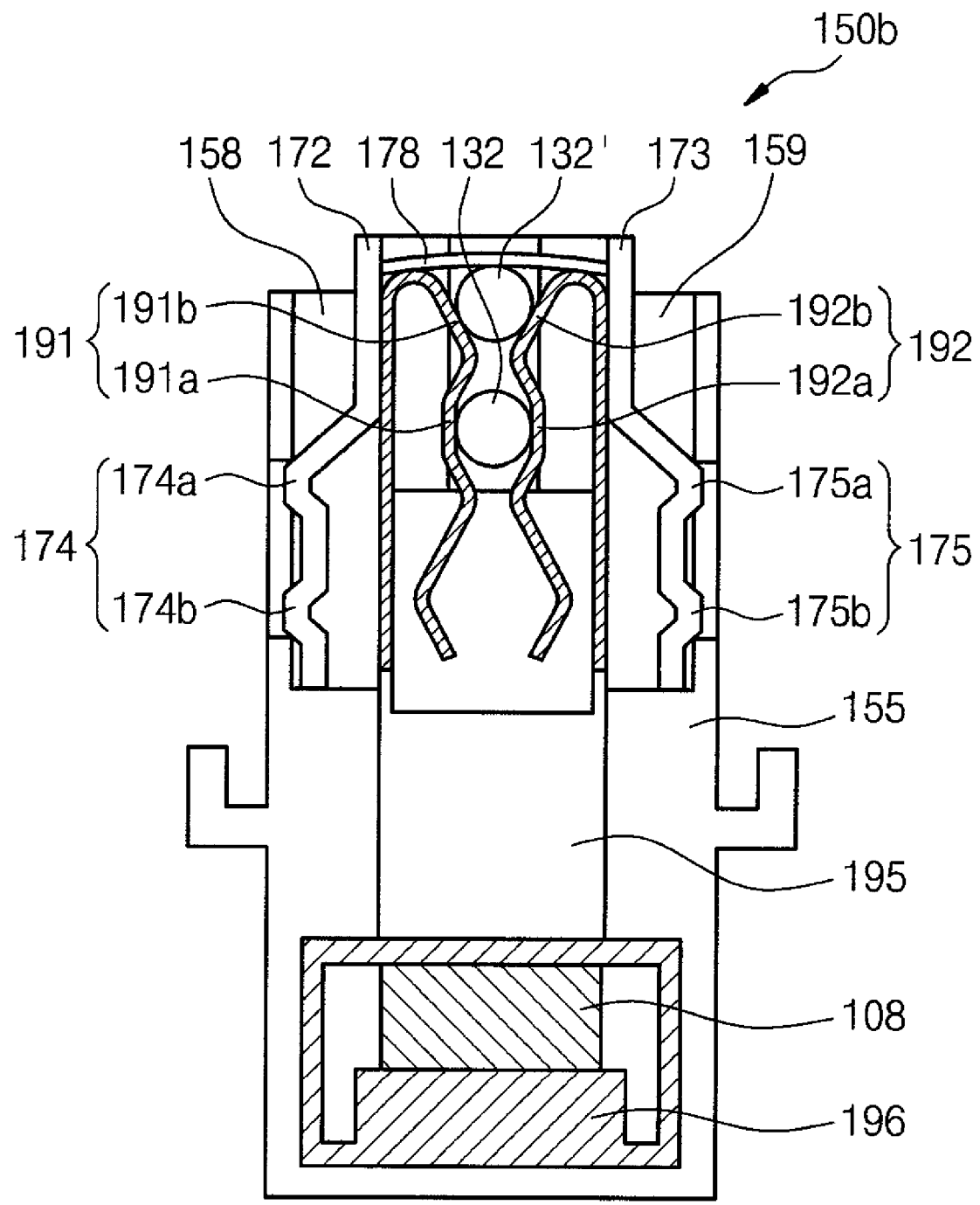
FIG. 5 is a cross-sectional view illustrating another exemplary of a lamp socket coupled with an inverter and a lamp according to the present disclosure.
Figure 6:
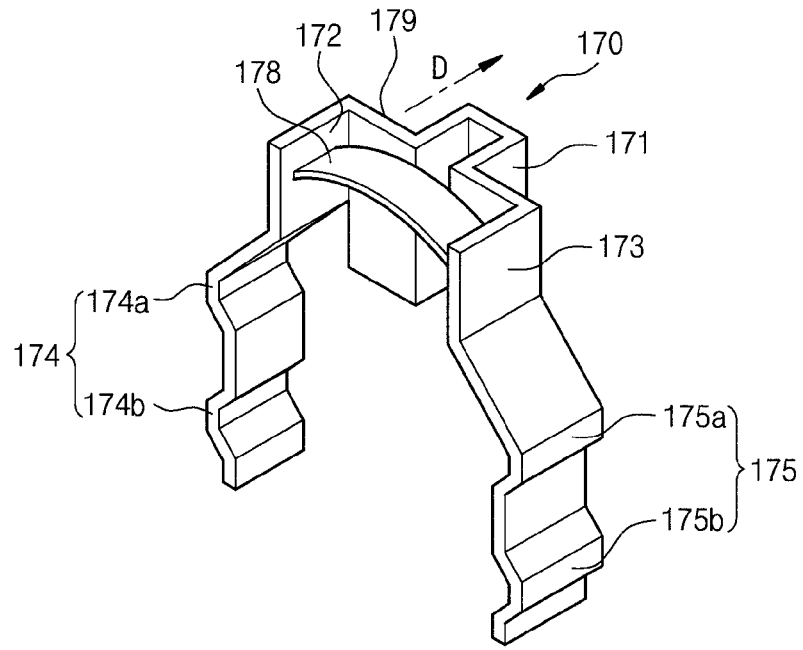
FIG. 6 is a perspective view illustrating another exemplary embodiment of a socket cover according to the present disclosure.

FIG. 5 is a sectional view illustrating another exemplary embodiment of a lamp socket coupled with an inverter and a lamp according to the present disclosure, and FIG. 6 is a perspective view illustrating another exemplary embodiment of a socket cover according to the present disclosure. In the exemplary embodiments of FIGS. 5-6, only the socket cover 170 has a different configuration from that of the first described socket cover 160 of FIG. 3, and thus, in FIGS. 5 and 6, the same reference numerals denote the same other elements in FIGS. 2 and 3, and the detailed descriptions of the same other elements will be omitted here.

Referring to FIGS. 5 and 6, the alternate socket cover 170 includes an upper first supporting portion 172 making contact with the first auxiliary terminal portion 191, an upper second supporting portion 173 making contact with the second auxiliary terminal portion 192, a lower first coupling portion 174 extended from the first supporting portion 172 toward the second socket terminal 196, a lower second coupling portion 175 extended from the second supporting portion 173 toward the second socket terminal 196, and a backend second connecting portion 179 connecting the first supporting portion 172 and the second supporting portion 173.

The socket cover 170 further includes a hooking portion 171. The hooking portion 171 is formed by bending the backend second connecting portion 179 in the direction D, so that the socket cover 170 and the lead terminal 132 are separated from each other by the hooking portion 171. Thus, whether the socket cover 170 includes the hooking portion or not is depends on the length of the lead terminal 132.

The first and the second auxiliary terminal portions 191 and 192 are embracingly supported with the first and second supporting portions 172 and 173, of the cover 170 thereby maintaining the grasping force of the first and the second auxiliary terminals 191 and 192. Therefore, the first and the second auxiliary terminals 191 and 192 may grip the lead terminal 132 stably.

The socket cover 170 further includes a capping or terminal cover 178 that connects upper portions of the first and the second supporting portions 172 and 173 to each other.

In the present exemplary embodiment, the first auxiliary terminal portion 191 includes a curve shaped first lower gripping portion 191a and another curve shaped first upper gripping portion 191b. The second auxiliary terminal 192 similarly includes a second lower grip portion 192a and a second upper grip portion 192b.

In one embodiment, the terminal cover 178 is composed of the same material as the socket cover 170 proper. In the case where the lead terminal 132 is deviated toward the terminal cover 178, the displaced lead terminal 132' may continue to be electrically connected to the first and second auxiliary terminal portions 191 and 192 through the first and second upper grip portions 191b and 192b since the terminal cover 178 prevents the displaced lead terminal 132' from becoming fully displaced apart from the first and second auxiliary terminal portions 191 and 192.

Additionally, the terminal cover 178 is not deformed although a spike of heat energy might be applied thereto from the occurrence of a spark at a nearby unstable contact point between the deviated lead terminal 132' and one of the first and second upper grip portions 191b and 192b. The reason is because the terminal cover 178 is able to absorb the spike of heat energy and dissipate it to the rest of the thermally conductive material of the cover 170. Consequently, the deviated lead terminal 132' may continue to be electrically connected in the long term to the first and second upper grip portions 191b and 192b even though it may sporadically disconnect due to its deviated state.

The lower first coupling portion 174 is formed by downwardly extending the first supporting portion 172 and partially bent to provide first convex portions 174a and 174b. The body 155 includes a first body coupling portion 158, and the first coupling portion 174 is inserted into the first body coupling portion 158, thereby connecting the socket cover 170 to the body 155.

The first body coupling portion 158 is formed by removal of a portion of the body 155 to receive the first supporting portion 172. Additionally, an inner side of the body 155 defining the first body coupling portion 158 is partially removed to receive the first convex portions 174a and 174b, thereby coupling the first coupling portion 174 with the first body coupling portion 158 more strongly.

The second coupling portion 175 is formed by downwardly extending the second supporting portion and partially bent to provide second convex portions 175a and 175b. The body 155 includes a second body coupling portion 159, and the second coupling portion 175 is inserted into the second body coupling portion 159, thereby connecting the socket cover 170 to the body 155.

The lower second body coupling portion 159 is formed by removal of a portion of the body 155 to receive the second supporting portion 173. In addition, an inner side of the body 155 defining the second body coupling portion 159 is partially removed to receive the second convex portions 175a and 175b, thereby coupling the second coupling portion 175 with the second body coupling portion 159 more strongly.

Figure 7:
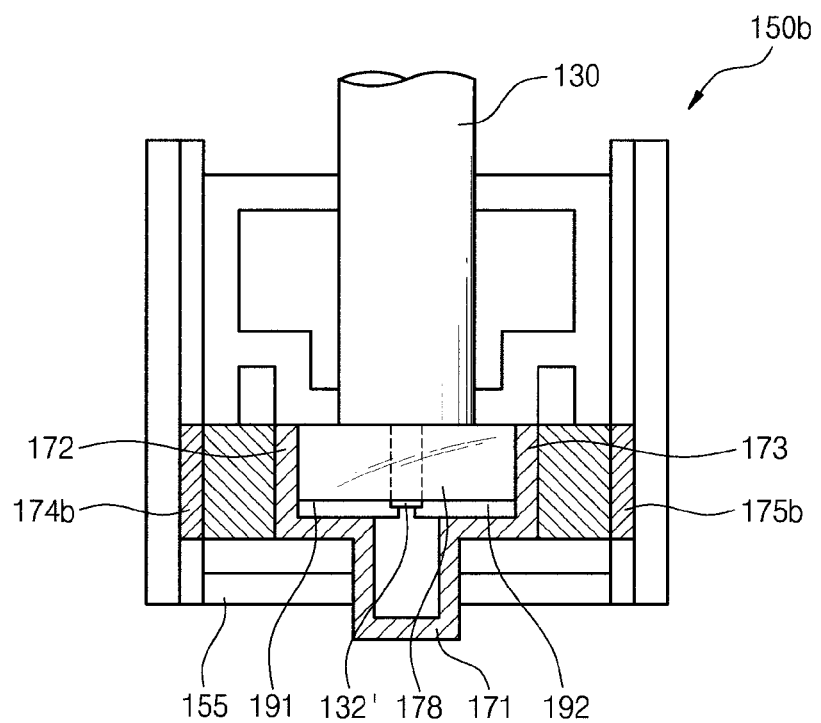
FIG. 7 is a plan view showing the lamp socket of FIG. 5.

FIG. 7 is a top sectional view showing the lamp socket of FIG. 5. In FIG. 7, the same reference numerals denote the same elements in FIG. 4, and thus the detailed descriptions of the same elements will be omitted.

Referring to FIG. 7, although the lead terminal 132' is upwardly deviated from normal contact with the first and second auxiliary terminal portions 191 and 192, the deviated lead terminal 132' may remain electrically connected to the cover 170 by action of the terminal cover 178. During assembly, the cover 170 can be snap inserted into the lamp socket after the lamp electrode 132 is inserted.

Figure 8:
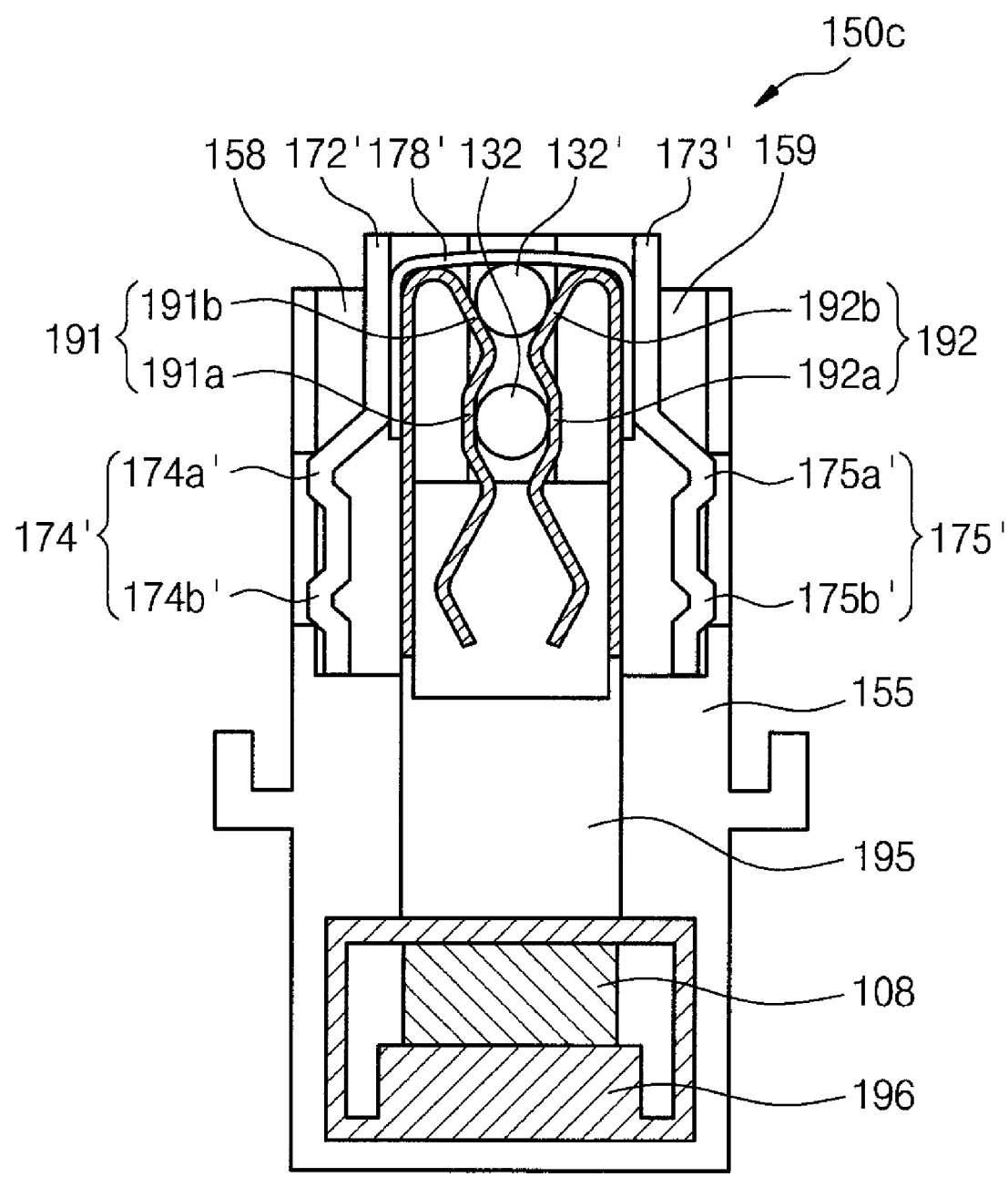
FIG. 8 is a sectional view illustrating another exemplary of a lamp socket coupled with an inverter and a lamp according to the present disclosure.
Figure 9:
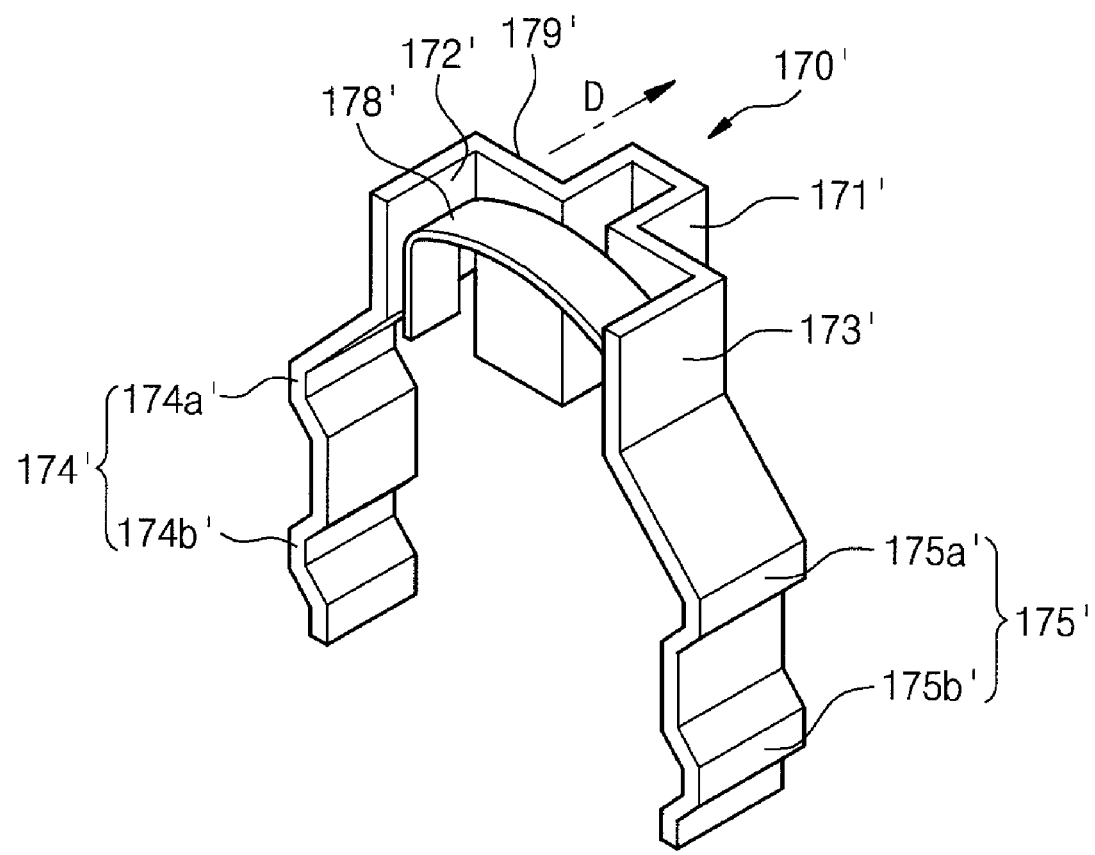
FIG. 9 is a perspective view illustrating another exemplary embodiment of a socket cover according to the present disclosure.

FIG. 8 is a sectional view illustrating another embodiment of a lamp socket coupled with an inverter and a lamp according to the present disclosure, and FIG. 9 is a plan view illustrating another exemplary embodiment of a socket cover according to the present disclosure. In the third embodiment, only the socket cover 170' has a different configuration from those of the socket cover 170 in FIG. 6, and thus, in FIGS. 8 and 9, the same reference numerals denote the same elements in FIGS. 5 and 6, and the detailed descriptions of the same elements will be omitted.

Referring to FIGS. 8 and 9, the lamp socket 170' includes a first supporting portion 172' making contact with a first auxiliary terminal 191, a second supporting portion 173' making contact with a second auxiliary terminal 192, a first coupling portion 174' extended from the first supporting portion 172' toward a second socket terminal 196, a second coupling portion 175' extended from the second supporting portion 173' toward the second socket terminal 196, and a second connecting portion 179' extended from the first supporting portion 172' toward the second supporting portion 173'.

The socket cover 170' further includes a hooking portion 171'. The hooking portion 171' is formed by bending the second connecting portion 179' in the direction D, so that the socket cover 170' and the lead terminal 132 are separated from each other. Thus, whether the socket cover 170' includes the hooking portion or not is depends on the length of the lead terminal 132.

The outer body 155 is made of a plastic material. Additionally, the first supporting portion 172', the second supporting portion 173', the first coupling portion 174', the second coupling portion 175', and the hooking portion 171' are also made of a plastic material (e.g., a heat tolerant thermoplastic).

The first and the second auxiliary terminal portions 191 and 192 are indirectly supported and embraced by the first and the second plastic supporting portions 172' and 173', so that the grasping force of the first and the second auxiliary terminals 191 and 192 can be maintained. Thus, the first and the second auxiliary terminals 191 and 192 can grip the lead terminal 132.

The socket cover 170' further includes a terminal cover 178' that is made of a metal material having good thermal and electrical conductivity, a good ability to absorb and dissipate a spike of heat energy and which is coupled with the first and the second plastic supporting portions 172' and 173'.

In this exemplary embodiment, the first auxiliary terminal portion 191 includes a first lower grip portion 191a and a first upper grip portion 191b, and the second auxiliary terminal portion 192 includes a second lower grip portion 192a and a second upper grip portion 192b.

The two end portions of the terminal cover 178' are attached onto the first and second supporting portions 172' and 173', respectively. Otherwise, the two end portions of the terminal cover 178' are bent to be coupled with the first and second supporting portions 172' and 173', respectively. In case that the two end portions of the terminal cover 178' are bent, the metal terminal cover 178' may be fastened to the first and second supporting portions 172' and 173' by its elasticity without need for a separate affixing means. If desired however, an appropriate glue or another fastening mechanism may be used to affix the metal terminal cover 178' to the plastic first and second supporting portions 172' and 173'.

The terminal cover 178' includes the heat tolerating and electrically conductive metal material, so that the lead terminal 132 may be electrically connected to the first and second upper grip portions 191b and 192b by action of the terminal cover 178' after the lead terminal 132 is deviated from the first and second grip portions 191a and 192a.

In addition, even if a spark occurs at an unstable contact point between the deviated lead terminal 132' and one of the first and second upper grip portions 191b and 192b, the terminal cover 178' is not deformed by the spike of heat energy generated from the spark. Moreover, the terminal cover 178' may block the heat from the spark that occurs around the deviated lead terminal 132'.

Therefore, when the metal terminal cover 178' is used, the socket cover 170' may be made of a plastic material with the exception of the terminal cover 178' being made of metal. In other words, the socket cover 170' can have durability against the heat from the spark that occurs around the deviated lead terminal 132' even though only the terminal cover 178' is made of the metal material. During assembly of the system, the metal terminal cover 178' may be resiliently inserted after the lamp is inserted into the lamp socket.

Figure 10:
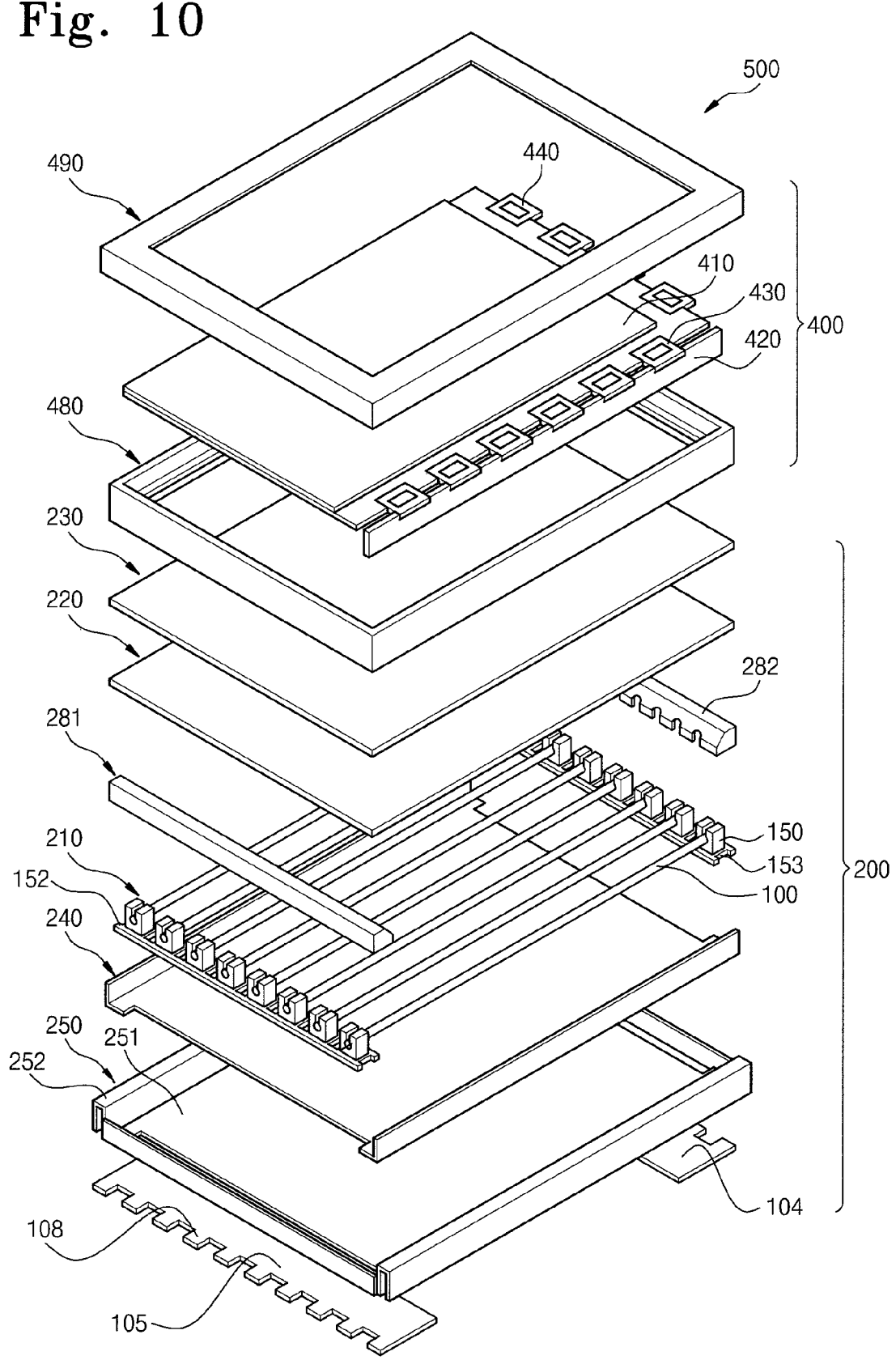
FIG. 10 is an exploded perspective view illustrating an assembly of an exemplary embodiment of a liquid crystal display system according to the present disclosure.

FIG. 10 is an exploded perspective view illustrating an exemplary assembly of a liquid crystal display system according to the present disclosure.

Referring to FIG. 10, the liquid crystal display 500 includes a backlight assembly 200 and a panel assembly 400.

The backlight assembly 200 includes a light emitting unit 210, a diffusing plate 220, an optical sheet 230, a reflecting plate 240, and a bottom chassis 250.

The light emitting unit 210 includes plural lamps for emitting light, plural lamp sockets each which is electrically connected to a corresponding lead terminal formed at two end portions of the lamps, and socket alignment frames 152 and 153 aligning the lamp sockets.

The lamps extend in a first direction and arranged at a distance in a second direction substantially perpendicular to the first direction. In the present exemplary embodiment, the lamp sockets have the same configurations as those of the lamp socket 150 (shown in FIG. 1), and thus the detailed descriptions of the lamp sockets will be omitted in order to avoid redundancy.

The diffusing plate 220 is placed at an upper position of the light emitting unit 210. The diffusing plate 220 diffuses the light emitted from the lamps to improve the uniformity of brightness. The diffusing plate 220 has a plate-like shape, and is separated from the lamps in a predetermined distance. The diffusing plate 220 includes a transparent material and a diffuser dispersed in the transparent material to diffuse the light.

The optical sheet 230 is arranged at an upper portion of the diffusing plate 220. The optical sheet 230 changes paths of the light that exits from the diffusing plate 220 to improve the brightness of the light. For example, the optical sheet 230 may include at least one of a prism sheet condensing the light to improve front brightness of the light and a diffusing sheet diffusing the light to improve the uniformity of the light.

The reflecting plate 240 is disposed under the lamps. The reflecting plate 240 reflects the light emitted from the lamps toward the optical sheet 220 to improve the light efficiency.

The light emitting unit 210 and the reflecting plate 240 are received in the bottom chassis 250. The bottom chassis 250 includes a bottom 250 on which the reflecting plate 240 is settled and a sidewall 252 extended from an end portion of the bottom 250 to provide a receiving space for the light emitting unit 210.

The backlight assembly 200 further includes inverter boards 104 and 105 on which inverter circuits are disposed for providing the lamps with an electric power. The inverter boards 104 and 105 are provided with plural inverter terminals 108 formed at one side of the inverter boards 104 and 105.

The inverter circuits on boards 104 and 105 boost an alternating current power having a low voltage level from a power supply unit (not shown) to output the alternating current power having a high voltage level suitable for driving the lamps.

The inverter boards 104 and 105 are located at the rear side of the bottom chassis 250 and arranged at two ends of the lamps, respectively.

The backlight assembly 200 further includes a first side mold frame 281 and a second side mold frame 282. The first and second side mold frames 281 and 282 are arranged at the two ends of the lamps, respectively. The first and second side molds 281 and 282 cover the lamp holders and fix the lamp holders to the bottom chassis 250, so that the lamp holders (sockets 150) are not outwardly exposed. The diffusing plate 220 and the optical sheet 230 are disposed on the first and second side mold frames 281 and 282. The first and second side mold frames 281 and 282 support the end portion of the diffusing plate 220 and guide the position of the diffusing plate 220.

The panel assembly 400 includes a liquid crystal display panel 410, a source printed circuit board 420, source tape carrier packages 430, and gate tape carrier packages 440.

The liquid crystal display panel 410 is placed at the upper position of the optical sheet 230 and displays an image using the light. The liquid crystal display panel 410 includes two substrates facing each other and a liquid crystal layer interposed between the two substrates. The source printed circuit board 420 is electrically connected to the liquid crystal display panel 410 by the source tape carrier packages 430. The source printed circuit board 420 outputs a data driving signal corresponding to the image and provides the source tape carrier packages 430 with the data driving signal. The gate tape carrier packages 440 are attached onto the liquid crystal display panel 410 to output a gate driving signal.

The panel assembly 400 further includes a middle mold 480 in which the liquid crystal display panel 410 is received. The middle mold 480 is coupled with the sidewall 252 of the bottom chassis 250 while supporting the end portions of the diffusing plate 220 and the optical sheet 230. The bigger the size of the middle mold 480 is, the harder the manufacturing of the middle mold 480 with the all-in-one design, so that the middle mold 480 may be divided into two or four parts.

The panel assembly 400 further includes a top chassis 490 guiding a position of the liquid crystal display panel 410. The top chassis 490 is coupled with the bottom chassis 250 to fix the liquid crystal display panel 410 to the middle mold 480. Thus, the source printed circuit board 420 is arranged between the sidewall 252 of the bottom chassis 250 and the top chassis 490.

According to the above, a socket cover is provided that maintains the grasping force of the resilient socket terminal into which the lead terminal of a lamp is received and the socket cover has durability against the heat impulse of a nearby electrical spark, so that the lamp lead terminal may remain stably connected to the socket terminal even it intermittently sparks. Thus, although the display device is operated in a long-time mode, the display device may provide a high-quality image.

Although exemplary embodiments have been described, it is understood that the present disclosure should not be limited to these exemplary embodiments but various changes and modifications can be made by one ordinary skilled in the art after appreciation of the above and within the spirit and scope of the present disclosure.

What is claimed is:

1. A display device comprising:
lamps emitting a light and each comprising a lead terminal formed at two end portions thereof;
a lamp socket electrically connected to the lead terminal;
an inverter providing an electric power to the lamp socket; and
a display panel displaying an image using the light,
wherein the lamp socket comprises:
a body;
a first socket terminal placed in the body and electrically connected to the lead terminal to provide the electric power from the inverter to the lamps;
a second socket terminal placed in the body and electrically connected to the first socket terminal to provide the electric power from the inverter to the first socket terminal; and
a socket cover comprising a metal material, the socket cover being located between the body and the first socket terminal and coupled with the first socket terminal so as to fix the lead terminal to the first socket terminal.

2. The display device of claim 1, wherein the first socket terminal comprises:
a first auxiliary terminal;
a second auxiliary terminal facing the first auxiliary terminal; and
a first connecting portion extended from the first and second auxiliary terminals to electrically connect the first and second auxiliary terminals to the second socket terminal, and
wherein the lead terminal is located between the first and second auxiliary terminals and gripped by the first and second auxiliary terminals.

3. The display device of claim 2, wherein the socket cover comprises:
a first supporting portion coupled with the first auxiliary terminal;
a second supporting portion combined with the second auxiliary terminal while facing the first supporting portion;
a second connecting portion electrically connected between the first supporting portion and the second supporting portion;
a first coupling portion extended from the first supporting portion toward the second socket terminal, and combined with the body by a first convex portion that is formed at the extending portion thereof; and
a second coupling portion extended from the second supporting portion toward the second socket terminal while facing the first coupling portion, and combined with the body by a second convex portion that is formed at the extending portion thereof.

4. The display device of claim 3, wherein the body comprises:
a first body coupling portion partially removed to receive the first coupling portion and provided with a coupling hole formed through the removed portion of the first body coupling portion, the coupling hole being coupled with the first convex portion; and
a second body coupling portion facing the first body coupling portion, partially removed to receive the second coupling portion and provided with a coupling hole formed through the removed portion of the second body coupling portion, the coupling hole being coupled with the second convex portion,
wherein sidewalls of the body are partially recessed at top portions thereof to receive the external light-emitting device.

5. The display device of claim 4, wherein the socket cover further comprises a hooking portion formed of a bending portion of the second connecting portion, where the hooking portion extends in a direction different from a direction in which the first coupling portion and the second coupling portion extend such that the hooking portion makes contact with a top surface of the body.

6. The display device of claim 4, wherein the lamp socket further comprises a terminal cover that is connected between upper portions of the first and second supporting portions, and prevents the lead terminal gripped by the first and second auxiliary terminals from being disconnected from the first and second auxiliary terminals.

7. The display device of claim 6, wherein the terminal cover comprises a metal material.

8. The display device of claim 1, wherein a surface of the socket cover is coated with a metal material.

9. A display device comprising:
lamps emitting a light and each comprising a lead terminal formed at two end portions thereof;
a lamp socket electrically connected to the lead terminal;
an inverter providing an electric power to the lamp socket; and
a display panel displaying an image using the light,
wherein the lamp socket comprises:
a body;
a first socket terminal placed in the body and electrically connected to the lead terminal to provide the electric power from the inverter to the lamps;
a second socket terminal placed in the body and electrically connected to the first socket terminal to provide the electric power from the inverter to the first socket terminal;
a socket cover comprising a metal material, the socket cover being located between the body and the first socket terminal and coupled with the first socket terminal so as to fix the lead terminal to the first socket terminal; and
a terminal cover comprising a metal material and coupled with the socket cover to cover the lead terminal that is electrically connected to the first socket terminal, and the terminal cover making contact with the first socket terminal.

10. The display device of claim 9, wherein the first socket terminal comprises:
a first auxiliary terminal;
a second auxiliary terminal facing the first auxiliary terminal; and
a first connecting portion extended from the first and second auxiliary terminals to electrically connect the first and second auxiliary terminals to the second socket terminal, and
wherein the lead terminal is located between the first and second auxiliary terminals and gripped by the first and second auxiliary terminals.

11. The display device of claim 10, wherein the terminal cover makes contact with the first auxiliary terminal and the second auxiliary terminal.

12. The display device of claim 10, wherein the socket cover comprises:
a first supporting portion coupled with the first auxiliary terminal;
a second supporting portion combined with the second auxiliary terminal while facing the first supporting portion;
a second connecting portion connects the first supporting portion to the second supporting portion;
a first coupling portion extended from the first supporting portion toward the second socket terminal, and combined with the body by a first convex portion that is formed at the extending portion thereof; and
a second coupling portion extended from the second supporting portion toward the second socket terminal while facing the first coupling portion, and combined with the body by a second convex portion that is formed at the extending portion thereof.

13. The display device of claim 12, wherein the terminal cover extends from the first supporting portion to the second supporting portion to prevent the lead terminal gripped by the first and second auxiliary terminals from being disconnected from the first and second auxiliary terminals.

14. The display device of claim 12, wherein the socket cover further comprises a hooking portion formed of a bending portion of the second connecting portion, the hooking portion extends in a direction being different from a direction in which the first coupling portion and the second coupling portion extend such that the hooking portion makes contact with a top surface of the body.

15. A display device comprising:
a plurality of lamps each structured to emit light and each comprising first and second lead terminals formed at respective first and second end portions of the lamp;
a lamp socket electrically connected to the first lead terminal of a first of the lamps;
an inverter structured to provide electric power to the lamp socket; and
a display panel structured to display images with use of light emitted at least from the first of the lamps,
wherein the lamp socket comprises:
a body;
a resilient first socket terminal placed in the body and making electrical contact with the first lead terminal to thereby couple electric power provided from the inverter to the first lead terminal;
a second socket terminal placed in the body and electrically connected to the first socket terminal to thereby couple electric power provided from the inverter to the first socket terminal;
a socket cover comprising an electrically conductive metal and being more stiff than the resilient first socket terminal, the socket cover being located between the body and the first socket terminal and the socket cover being coupled with the first socket terminal so as to thereby position the first socket terminal and assist the resilient first socket terminal with said making of electrical contact with the first lead terminal; and a terminal cover comprising a metal material and coupled with the socket cover so as to cover the lead terminal, the terminal cover also making contact with the resilient first socket terminal.

* * * * *